United States Patent
Klock

(10) Patent No.: US 12,522,313 B2
(45) Date of Patent: Jan. 13, 2026

(54) FAIRING EXTENSION FOR MOTOR VEHICLES

(71) Applicant: Brian R. Klock, Mitchell, SD (US)

(72) Inventor: Brian R. Klock, Mitchell, SD (US)

(*) Notice: Subject to any disclaimer, the term of this patent is extended or adjusted under 35 U.S.C. 154(b) by 363 days.

(21) Appl. No.: 18/160,994

(22) Filed: Jan. 27, 2023

(65) Prior Publication Data
US 2024/0253724 A1    Aug. 1, 2024

(51) Int. Cl.
*B62J 17/00* (2020.01)
*B62J 17/04* (2006.01)
*B62K 11/14* (2006.01)

(52) U.S. Cl.
CPC ............... *B62J 17/04* (2013.01); *B62K 11/14* (2013.01)

(58) Field of Classification Search
CPC ... B62J 11/14; B62J 17/10; B62J 17/04; B62J 17/00
See application file for complete search history.

(56) References Cited

U.S. PATENT DOCUMENTS

| | | | | |
|---|---|---|---|---|
| 4,331,358 A | * | 5/1982 | Johnson | B62J 17/04 296/78.1 |
| 4,529,242 A | * | 7/1985 | Watanabe | B60S 1/0438 296/70 |
| 6,042,171 A | * | 3/2000 | Hesse | B62J 17/06 296/78.1 |
| 2005/0200153 A1 | * | 9/2005 | Khan | B62J 23/00 296/78.1 |

* cited by examiner

*Primary Examiner* — Steven O Douglas
(74) *Attorney, Agent, or Firm* — ICE MILLER LLP

(57) ABSTRACT

The present disclosure relates to a motor vehicle including a frame, a fairing, handlebars, and at least one fairing extension. The fairing and said handlebars are connected to the frame, such that the fairing deflects air about the handlebars at a first deflection angle. The fairing is removably attached to the at least one adjustable wind fairing extension, the fairing extension including at least one planar surface and, in some embodiments, at least one extendible planar surface, a hinge, an aperture, and at least one adjustment pin. The extendible planar surface is adjustable about said hinge along an adjustment plane up to the maximum extension allowed by the at least one adjustment pin. The fairing extension deflects air about the handlebars at a second deflection angle. The extension of the extendible planar surface deflects air about the handlebars at a third deflection angle.

14 Claims, 20 Drawing Sheets

FAIRING EXTENSION FOR MOTOR VEHICLES

BACKGROUND

Operators of vehicles, such as utility task vehicles, all-terrain vehicles, motorcycles, and other similar vehicles often face high velocity winds, generated naturally or by the movement of the vehicle. In addition to high velocity winds, precipitation, debris, sand, mud, insects, etc. may also come into contact with the operator of such vehicles. However, it is highly desirable for many types of vehicles to include an open front area to maintain a high level of operator visibility and to enhance the operator experience in general. While some vehicles are equipped with shielding items like windshield and fairings of various shapes and configurations, many do not provide such protection for the operator.

Where a motor vehicle such as a motorcycle does include a fairing, the fairing as originally manufactured may not provide the desired level of shielding and buffering. Additionally, depending on the weather and operating conditions present at a given time, the operator of the motor vehicle may prefer more shielding and buffering in some situations and less shielding and buffering in other situations. Therefore, there exists a need for a fairing extension, including an adjustable fairing extension, as well as vehicles including such fairing extensions, to improve the operation and experience of the operator while traveling without significantly adversely impacting the functioning of the operator or the vehicle.

SUMMARY

The present disclosure includes a motor vehicle including a frame, a fairing, handlebars, and at least one adjustable fairing extension. In at least one embodiment, such a fairing and said handlebars are connected to said frame such that the handlebars are positioned rearward of the fairing when viewed from the operator's position, such that the fairing deflects air about the handlebars at a first deflection angle. In at least one embodiment, the fairing is removably attached to the at least one adjustable wind fairing extension. According to an embodiment, said adjustable wind fairing extension comprises at least one planar surface, at least one extendible planar surface, a hinge, an aperture, and at least one adjustment pin. According to an embodiment, the extendible planar surface attaches to the at least one planar surface via the hinge and the at least one adjustment pin is inserted through the aperture on the extendible planar surface, such that the extendible planar surface is adjustable about said hinge along an adjustment plane up to the maximum extension allowed by the at least one adjustment pin. According to an embodiment, the extension of the extendible planar surface deflects air about the handlebars at a second deflection angle. In an aspect of such an embodiment, the at least one planar surface of the fairing extension comprises at least one deflection channel. In an aspect of such an embodiment, the maximum extension of the extendible planar surfaces is two inches or more. In an aspect of such an embodiment, the maximum extension of the extendible planar surface is between one and two inches. In an aspect of such an embodiment, the maximum extension of the extendible planar surfaces is less than one inch. In an aspect of such an embodiment the at least one fairing extension comprises four planar surfaces. In an aspect of such an embodiment, the at least one fairing extension comprises two extendible planar surfaces.

The present disclosure includes an adjustable fairing extension comprising at least one planar surface, at least one extendible planar surface, a hinge, an aperture, and at least one adjustment pin. In at least one embodiment, the extendible planar surface attaches to the at least one planar surface via the hinge and the at least one adjustment pin is inserted through the aperture of said extendable planar surface, such that the extendible planar surface is adjustable about said hinge along an adjustment plane up to the maximum extension allowed by the at least one adjustment pin. In at least one embodiment, the extension of the at least one extendible planar surface deflects air about the handlebars at a second deflection angle. In an aspect of such an embodiment, the at least one planar surface comprises at least one deflection channel. In an aspect of such an embodiment, the maximum extension of the extendible planar surfaces is two inches or more. In an aspect of such an embodiment the maximum extension of the at least one extendible planar surface is between one and two inches. In an aspect of such an embodiment, the maximum extension of the at least one extendible planar surface is less than one inch. In an aspect of such an embodiment, the fairing extension comprises four planar surfaces. In an aspect of such an embodiment, the fairing extension comprises two extendible planar surfaces.

The present disclosure includes a motor vehicle comprising a frame, a fairing, handlebars, and at least one fairing extension. In at least one embodiment said fairing and said handlebars are connected to said frame such that the handlebars are positioned relative to the frame and the fairing, such that the fairing deflects air about the handlebars at a first deflection angle. In at least one embodiment, the at least one fairing extension is removably attached to the fairing, said fairing extension comprising at least one planar surface configured to increase the deflection angle from the first deflection angle to a second deflection angle. In an aspect of such an embodiment, the fairing extension is attached to the fairing by an adhesive material. In an aspect of such an embodiment, the fairing extension is attached to the fairing by one or more fasteners. In an aspect of such an embodiment, the second deflection angle is more than 30 degrees. In an aspect of such an embodiment, the second deflection angle is more than 35 degrees. In an aspect of such an embodiment, the second deflection angle is more than 40 degrees. In an aspect of such an embodiment, the second deflection angle is more than 45 degrees.

BRIEF DESCRIPTION OF THE FIGURES

The embodiments described herein, and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
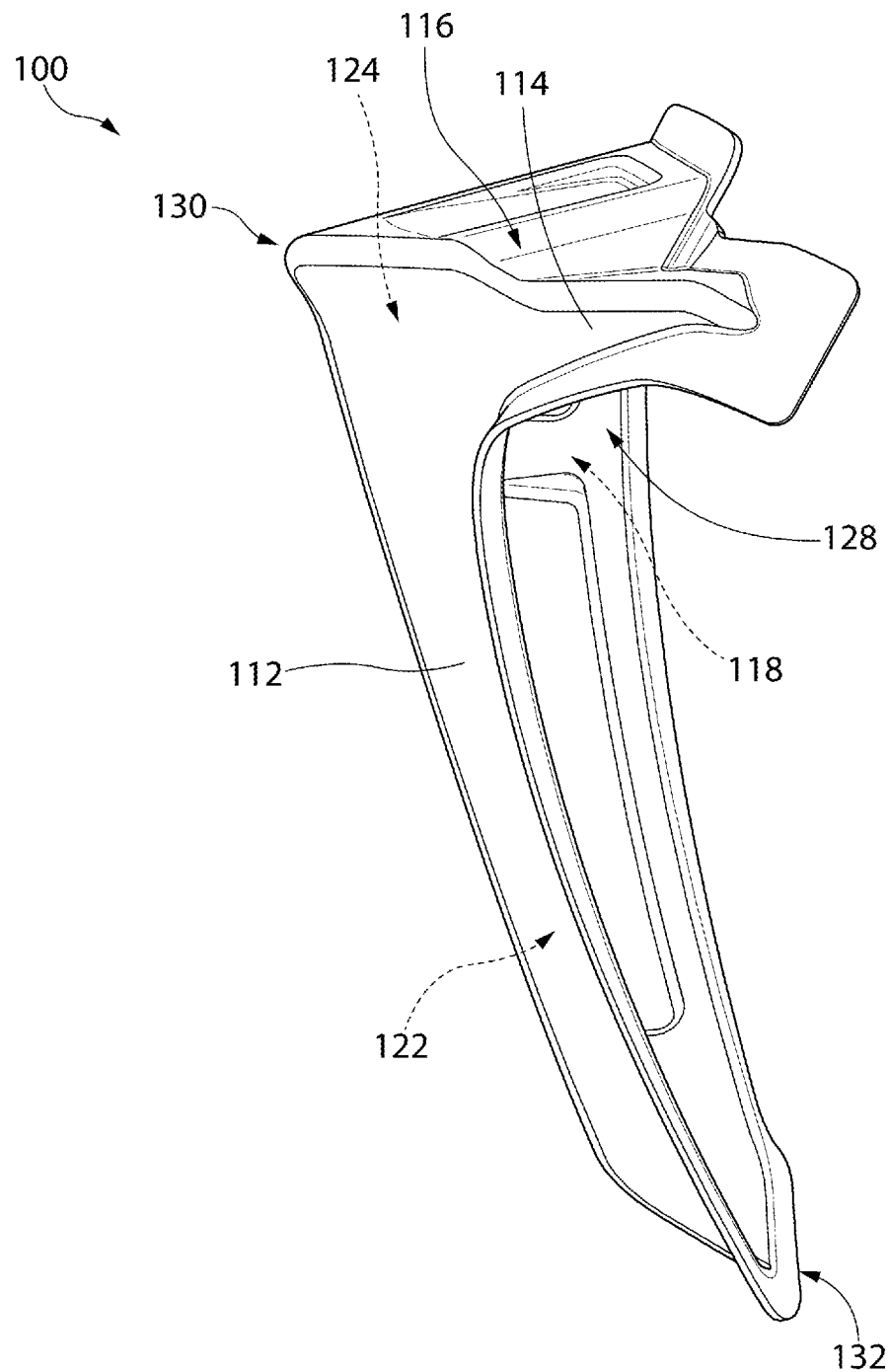
FIG. 1 is a side view of a wind deflector according to an embodiment of the present disclosure.
Figure 2:
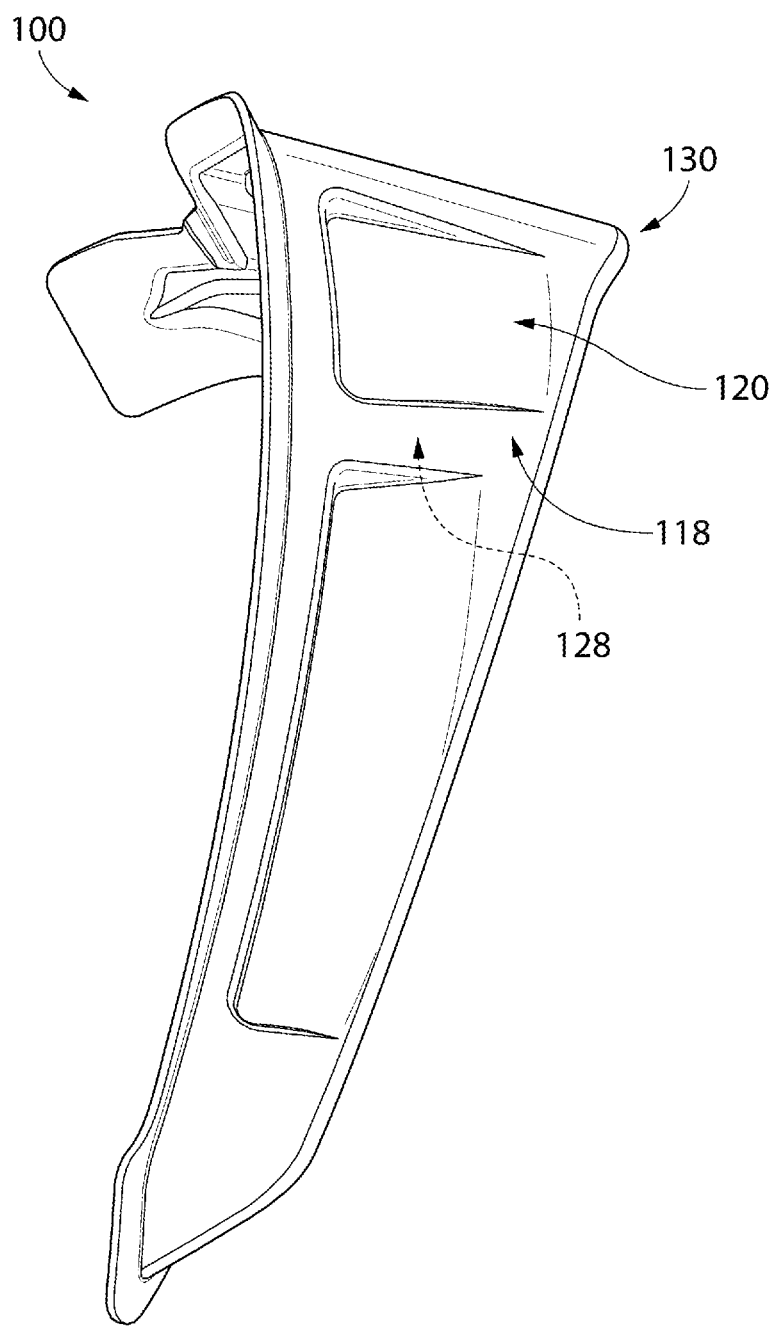
FIG. 2 is a side view of a wind deflector according to an embodiment of the present disclosure.
Figure 3:
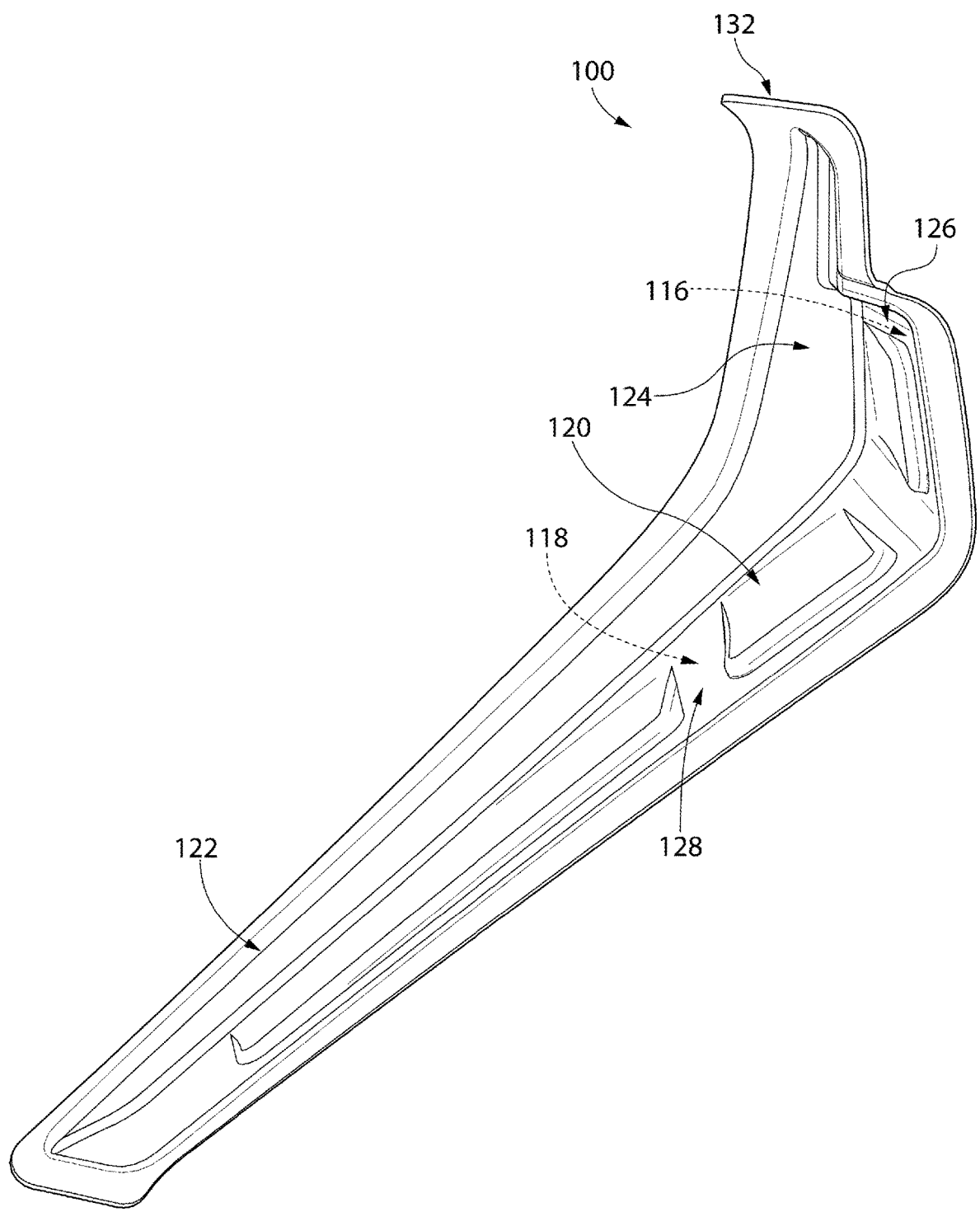
FIG. 3 is a rear perspective view of a wind deflector according to an embodiment of the present disclosure.
Figure 4:
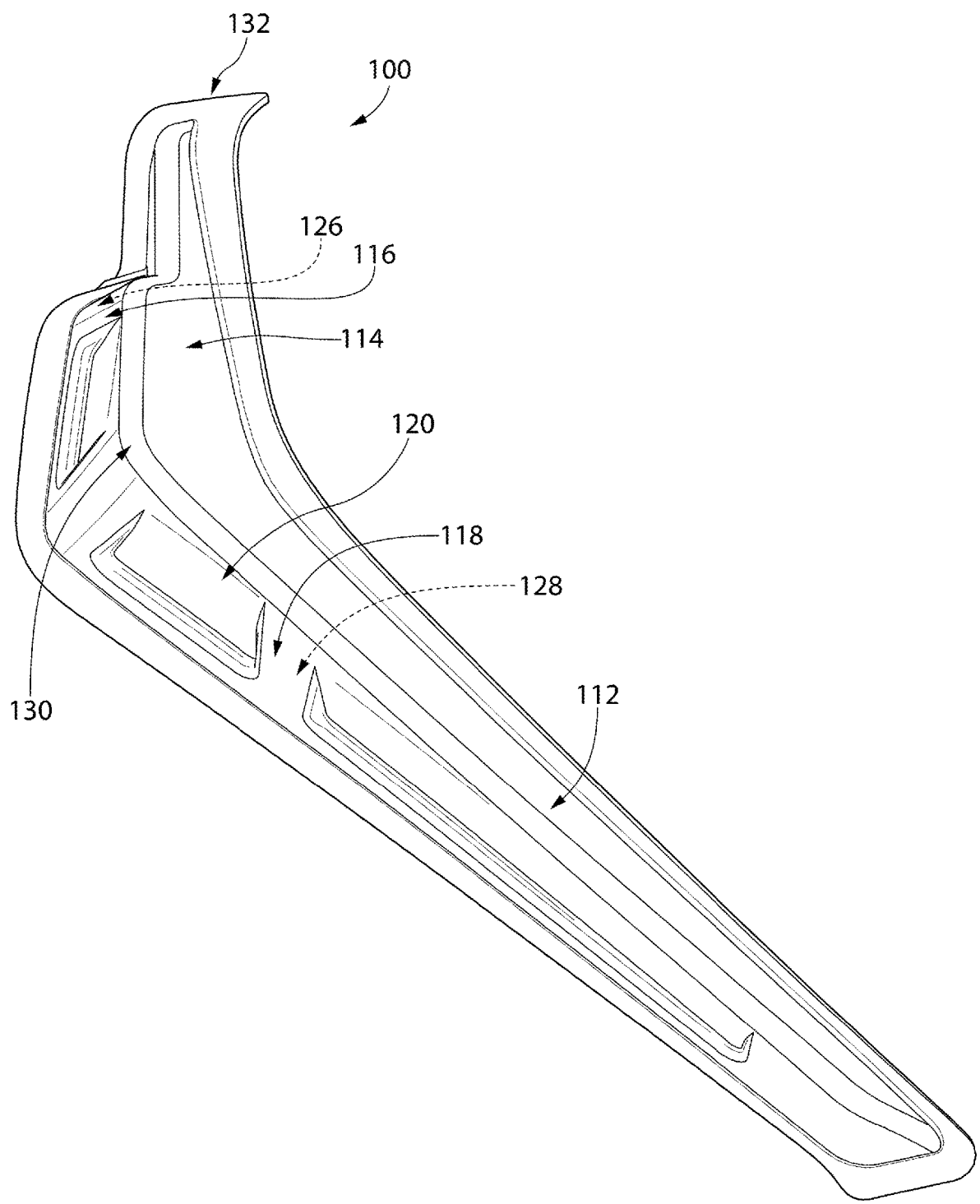
FIG. 4 is a rear view of a wind deflector according to an embodiment of the present disclosure.
Figure 5:
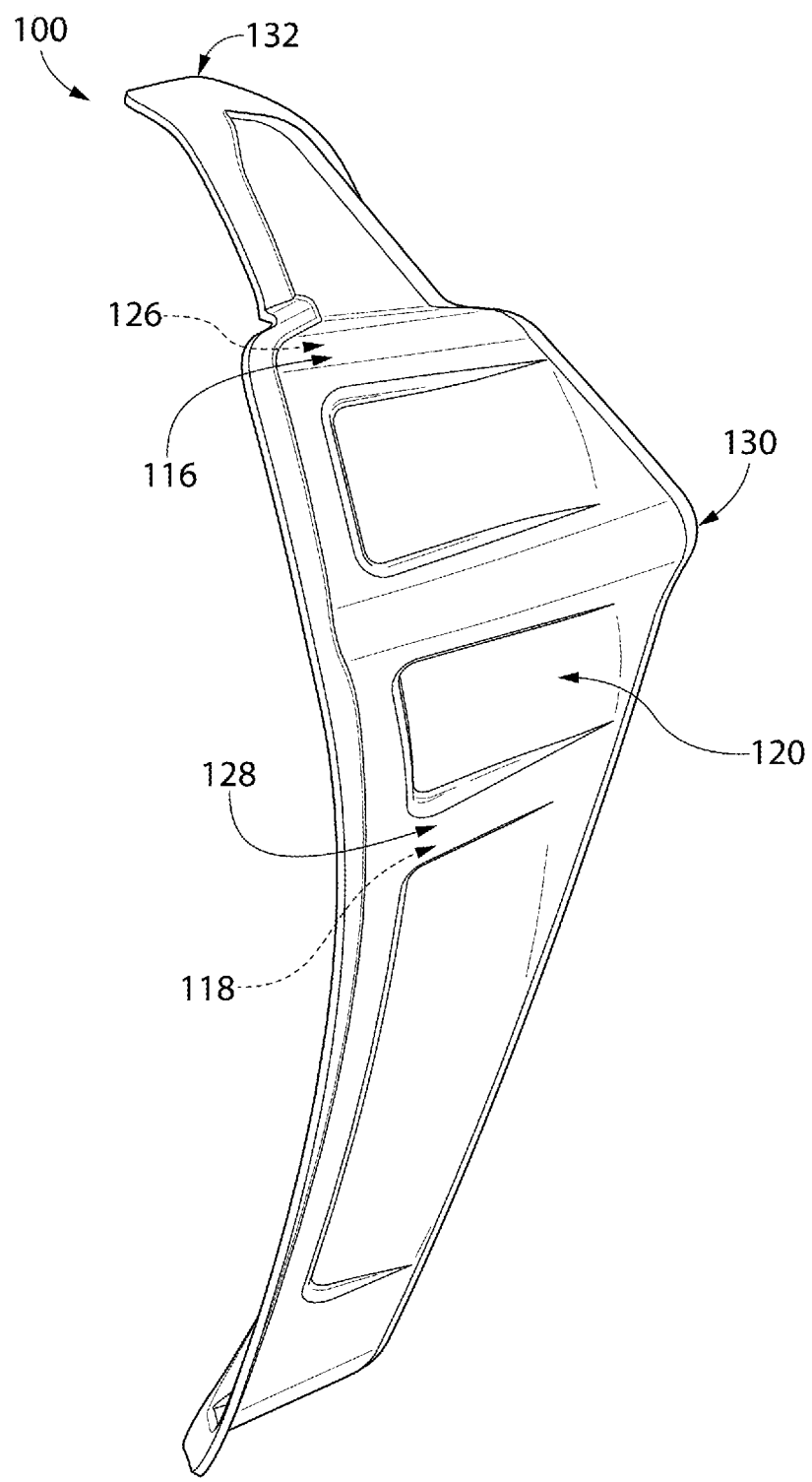
FIG. 5 is a front view of a wind deflector according to an embodiment of the present disclosure.
Figure 6:
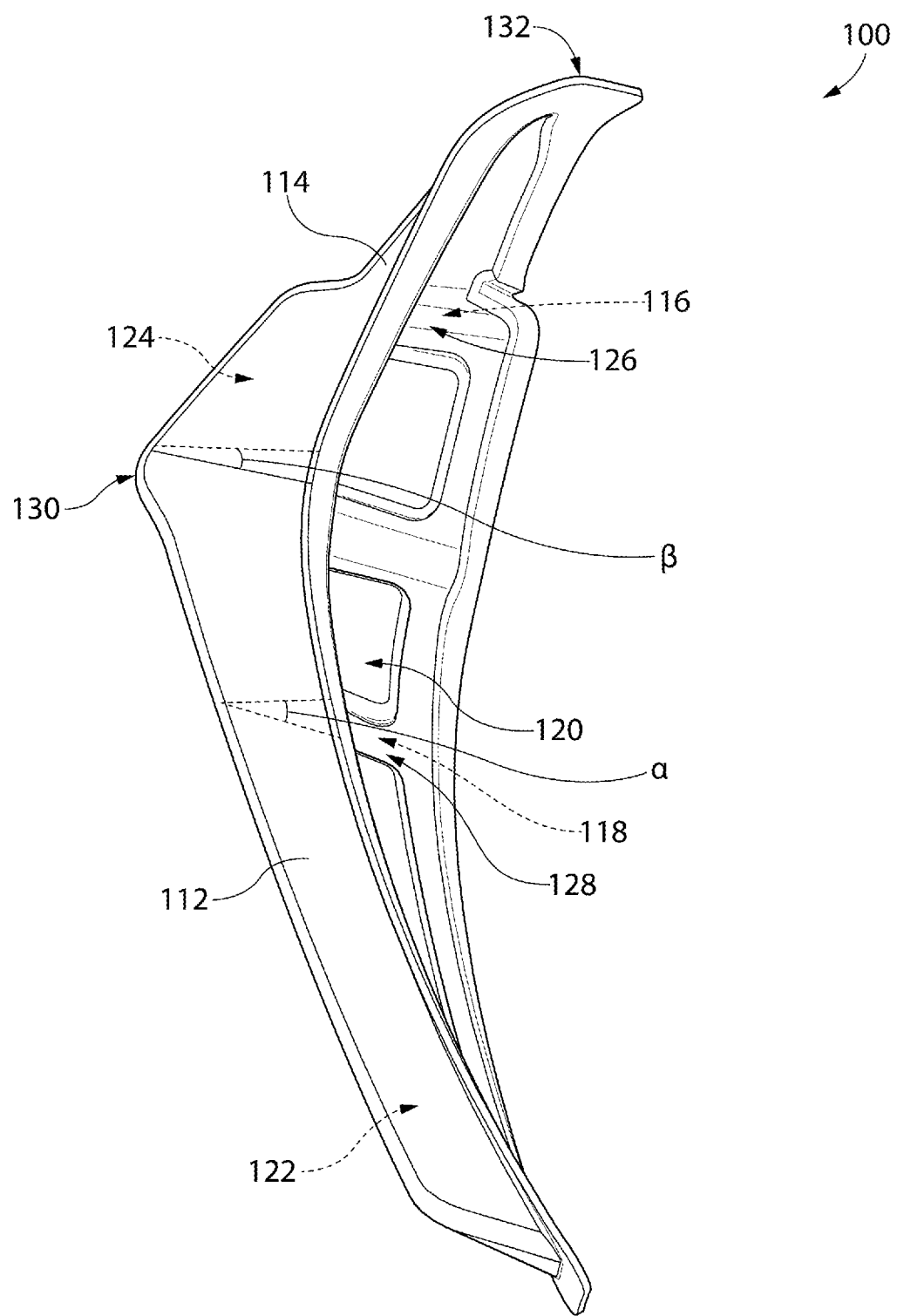
FIG. 6 is a rear view of a wind deflector according to an embodiment of the present disclosure.
Figure 7:
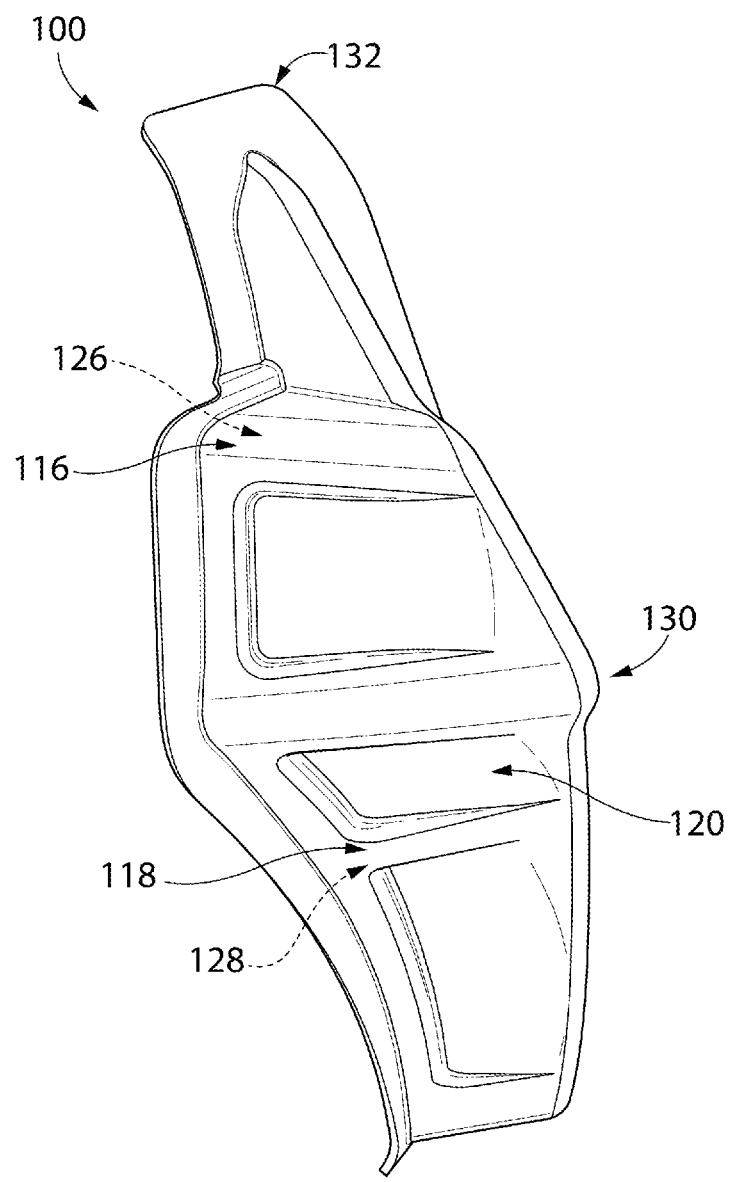
FIG. 7 is a front perspective view of a wind deflector according to an embodiment of the present disclosure.
Figure 8:
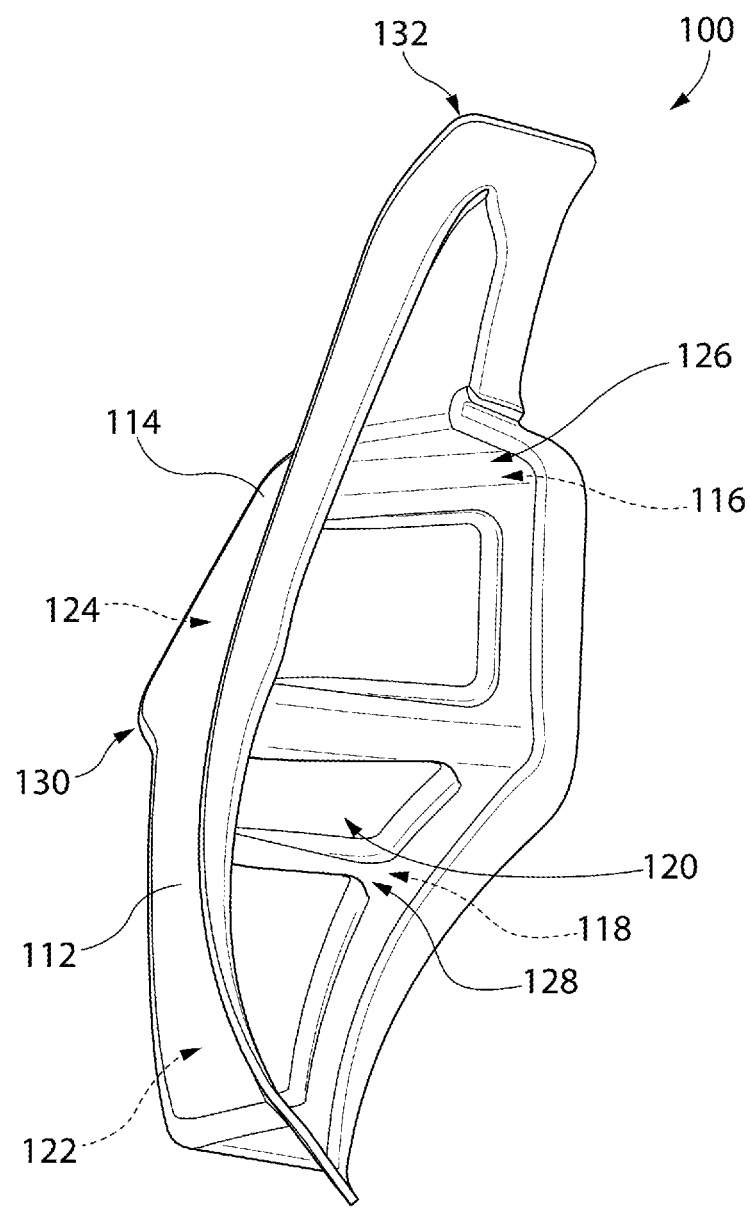
FIG. 8 is a rear perspective view of a wind deflector according to an embodiment of the present disclosure.

Referring now to FIGS. 1-8, the fairing extension 100 is illustrated in accordance with an embodiment of the present disclosure. According to an embodiment, the fairing extension 100 includes a first, second, third, and fourth external planar surfaces 112, 114, 116, and 118, respectively. According to an embodiment, the fairing extension 100 has three external planar surfaces. According to an embodiment, the fairing extension 100 has two external planar surfaces. According to an embodiment, the fairing extension 100 has one external planar surface. The external planar surfaces 112-118 include a number of deflection channels 120. According to an embodiment, the fairing extension 100 includes a first, second, third, and fourth internal planar surfaces 122, 124, 126, and 128, respectively. According to an embodiment, the fairing extension 100 has three internal planar surfaces. According to an embodiment, the fairing extension 100 has two internal planar surfaces. According to an embodiment, the fairing extension 100 has one internal planar surface.

According to an embodiment of the present disclosure, the fairing extension 100 includes a leading edge 130. The leading edge 130 connects the first external planar surface 112 to the fourth external planar surface 118. The leading edge 130 also connects the second external planar surface 114 to the third external planar surface 116. According to an embodiment, the first external planar surface 112 and the fourth external planar surface 118 join together along the leading edge 130 to create deflection angle α and the second external planar surface 114 and the third external planar surface 116 join together along the leading edge 130 to create deflection angle β. According to an embodiment, deflection angle α and deflection angle β each result in the movement of air, debris, precipitation, sand, mud, insects, etc. in a predetermined direction. According to an embodiment, deflection angle α and deflection angle β result in the movement of winds, precipitation, debris, sand, mud, insects, etc. away from the operator (not shown). According to an embodiment, the deflection angle α is 45 degrees or less. According to an embodiment, the deflection angle α is 40 degrees or less. According to an embodiment, the deflection angle α is 35 degrees or less. According to an embodiment, the deflection angle α is 30 degrees or less. According to an embodiment, the deflection angle β is 45 degrees or less. According to an embodiment, the deflection angle β is 40 degrees or less. According to an embodiment, the deflection angle β is 35 degrees or less. According to an embodiment, the deflection angle β is 30 degrees or less. According to an embodiment, deflection angle α and deflection angle β are equal. According to another embodiment of the present invention, deflection angle α and deflection angle β are not equal. According to an embodiment, the deflection channels 120 each facilitate the movement of air, debris, precipitation, sand, mud, insects, etc. in a predetermined direction. According to an embodiment, the deflection channels 120 each facilitate the movement of air, debris, precipitation, sand, mud, insects, etc. away from the operator (not shown), thereby enhancing performance and/or operation of the vehicle (not shown).

According to an embodiment of the present disclosure, the fairing extension 100 includes an outer edge 132. According to an embodiment, the outer edge 132 facilitates connection to a vehicle (not shown). According to an embodiment, the outer edge 132 comprises a fastener to releasably attach the fairing extension 100 to a vehicle (not shown).

Figure 9:
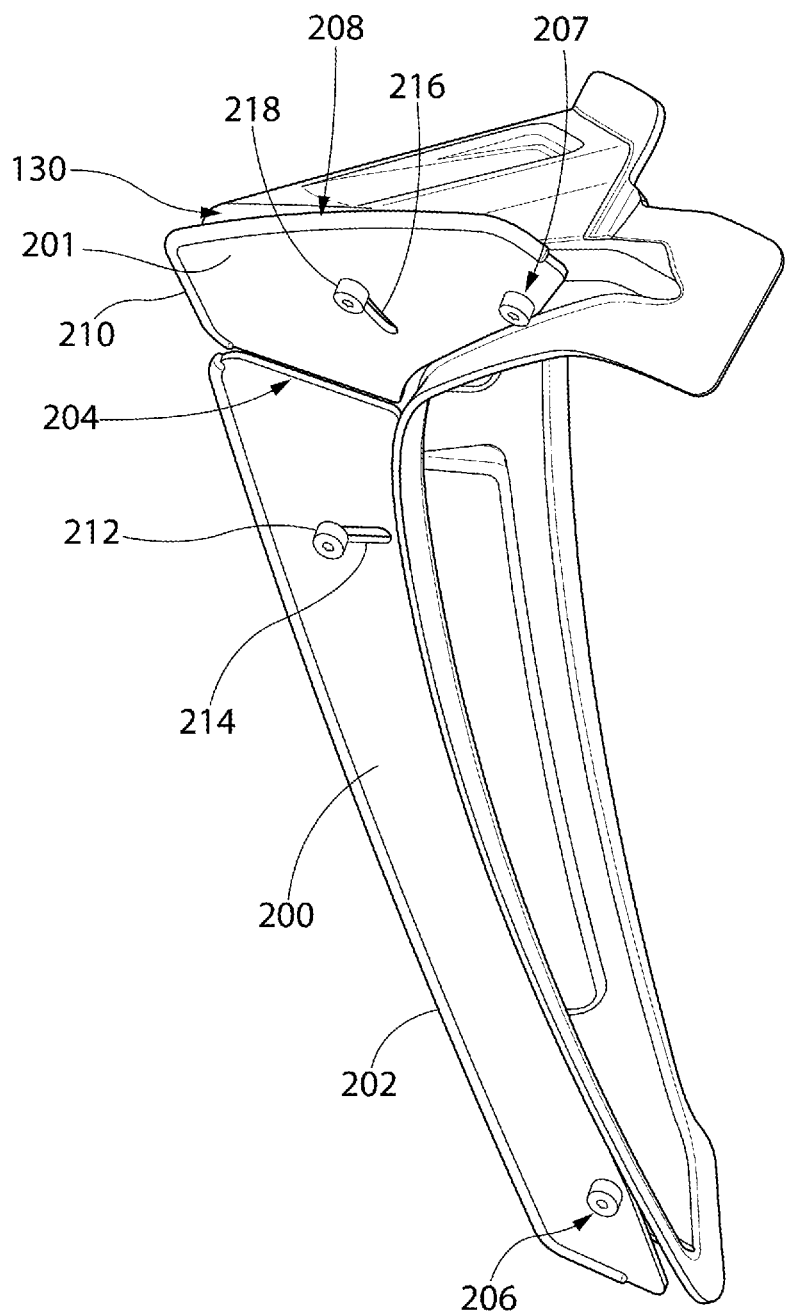
FIG. 9 is a rear view of an adjustable wind deflector according to an embodiment of the present disclosure.
Figure 10:
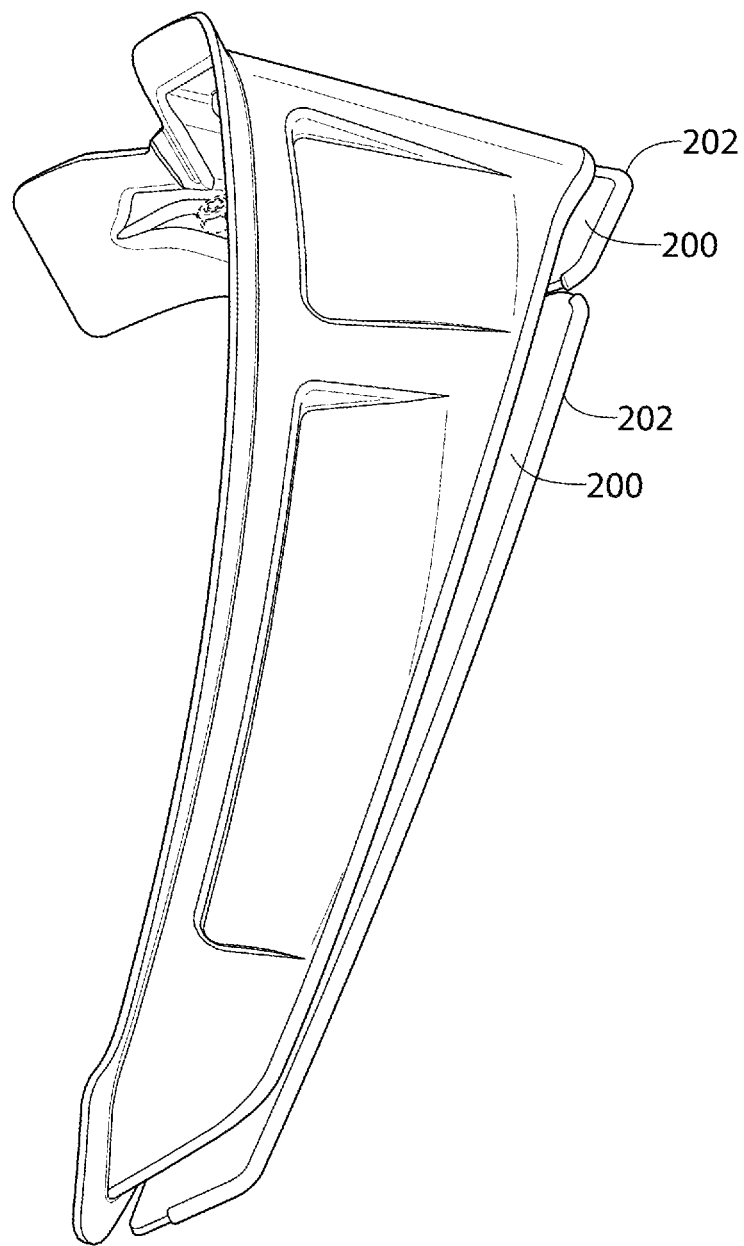
FIG. 10 is a front view of an adjustable wind deflector according to an embodiment of the present disclosure.
Figure 11:
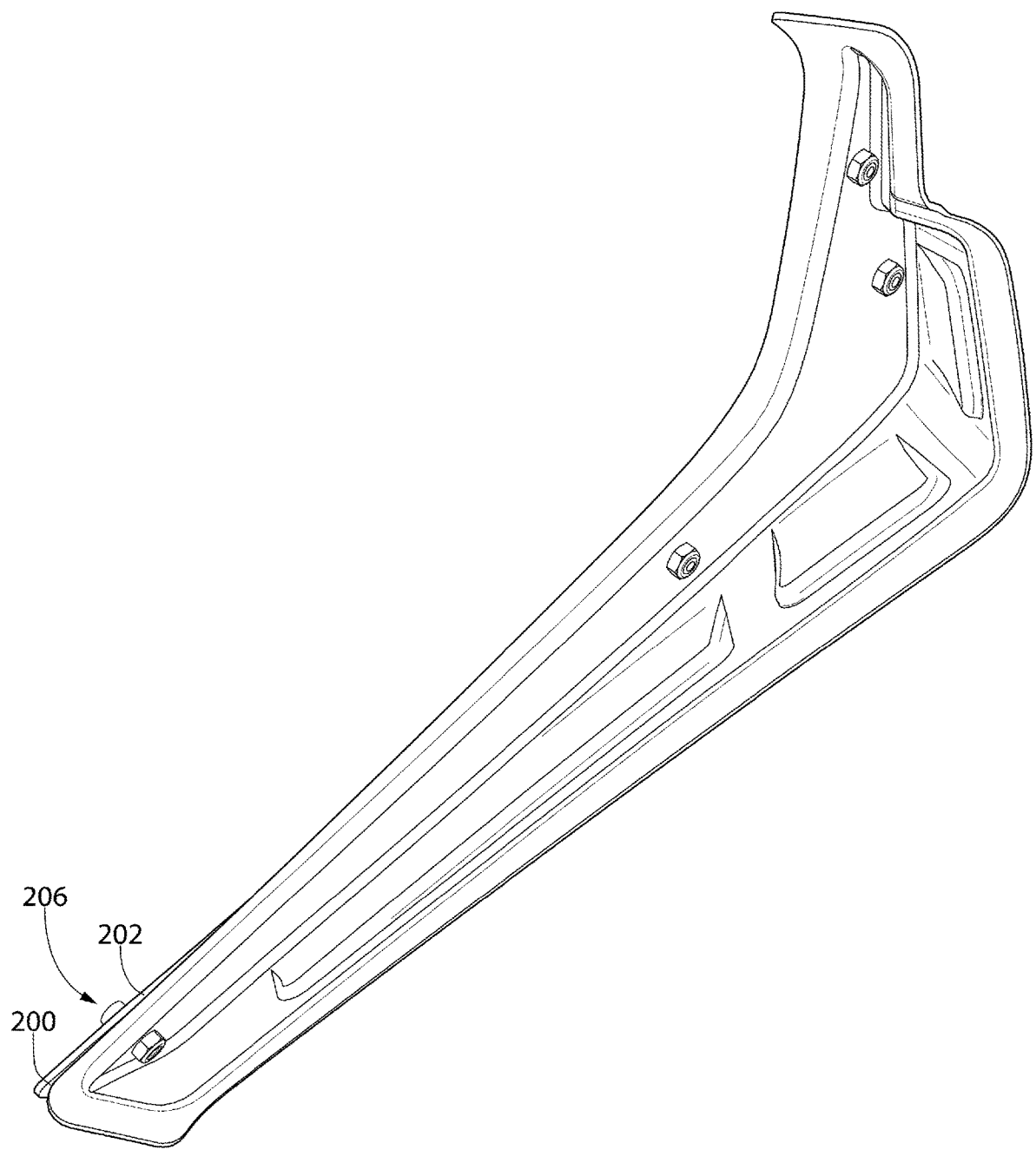
FIG. 11 is a rear view of an adjustable wind deflector according to an embodiment of the present disclosure.
Figure 12:
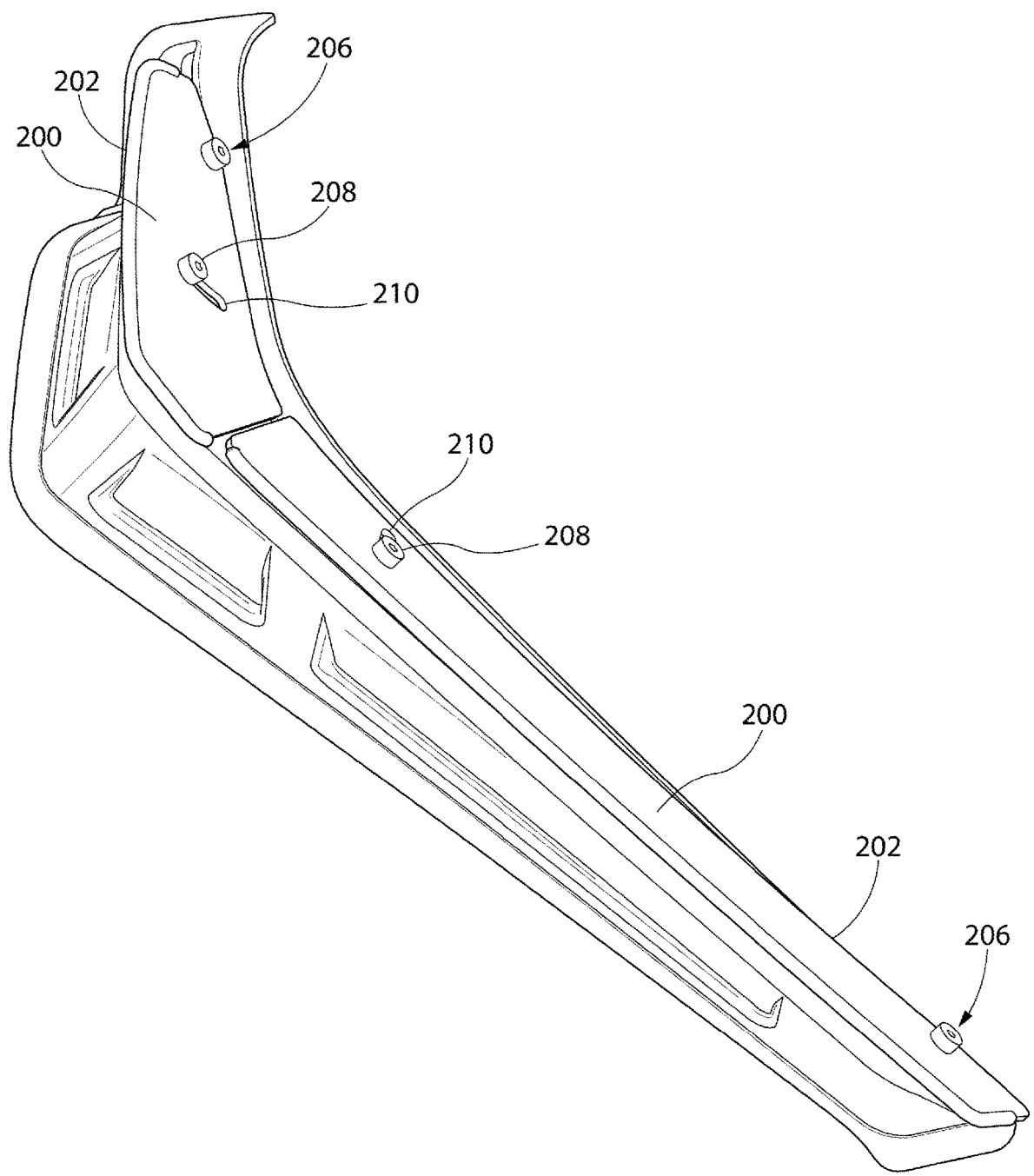
FIG. 12 is a left-side perspective view of an adjustable wind deflector according to an embodiment of the present disclosure.
Figure 13:
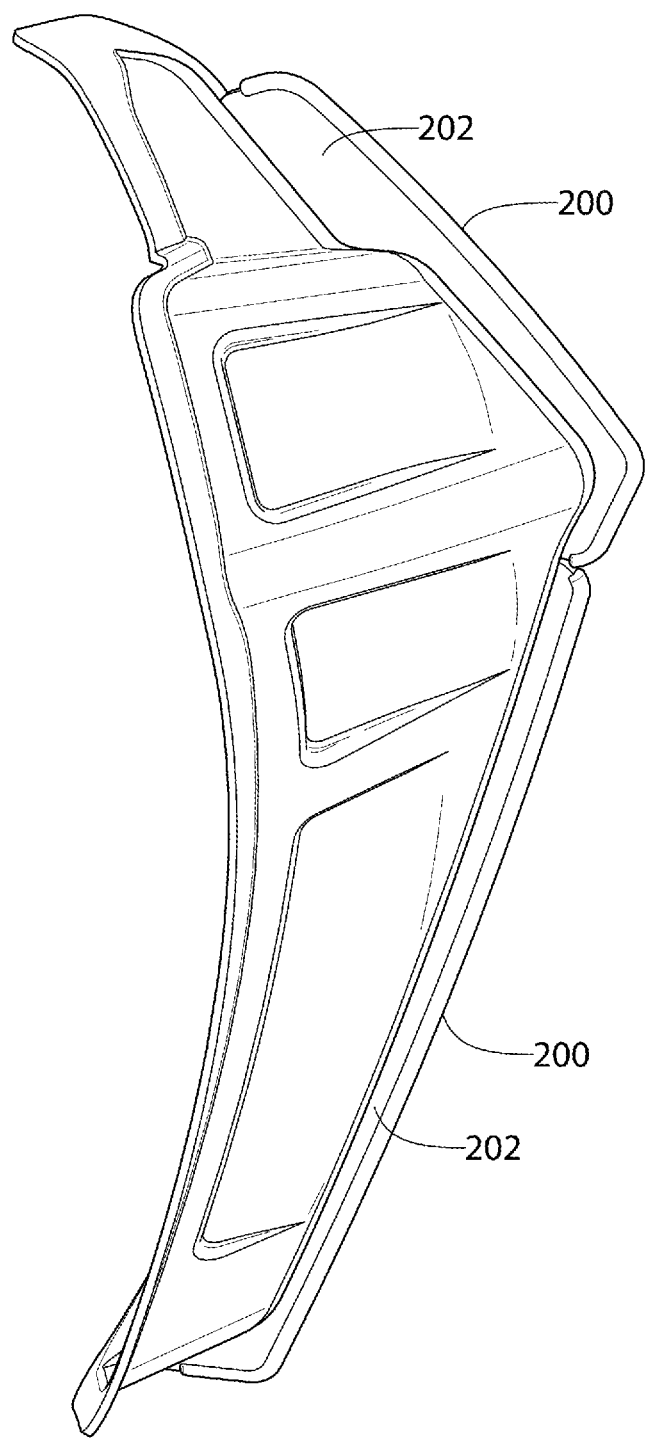
FIG. 13 is a front view of an adjustable wind deflector according to an embodiment of the present disclosure.
Figure 14:
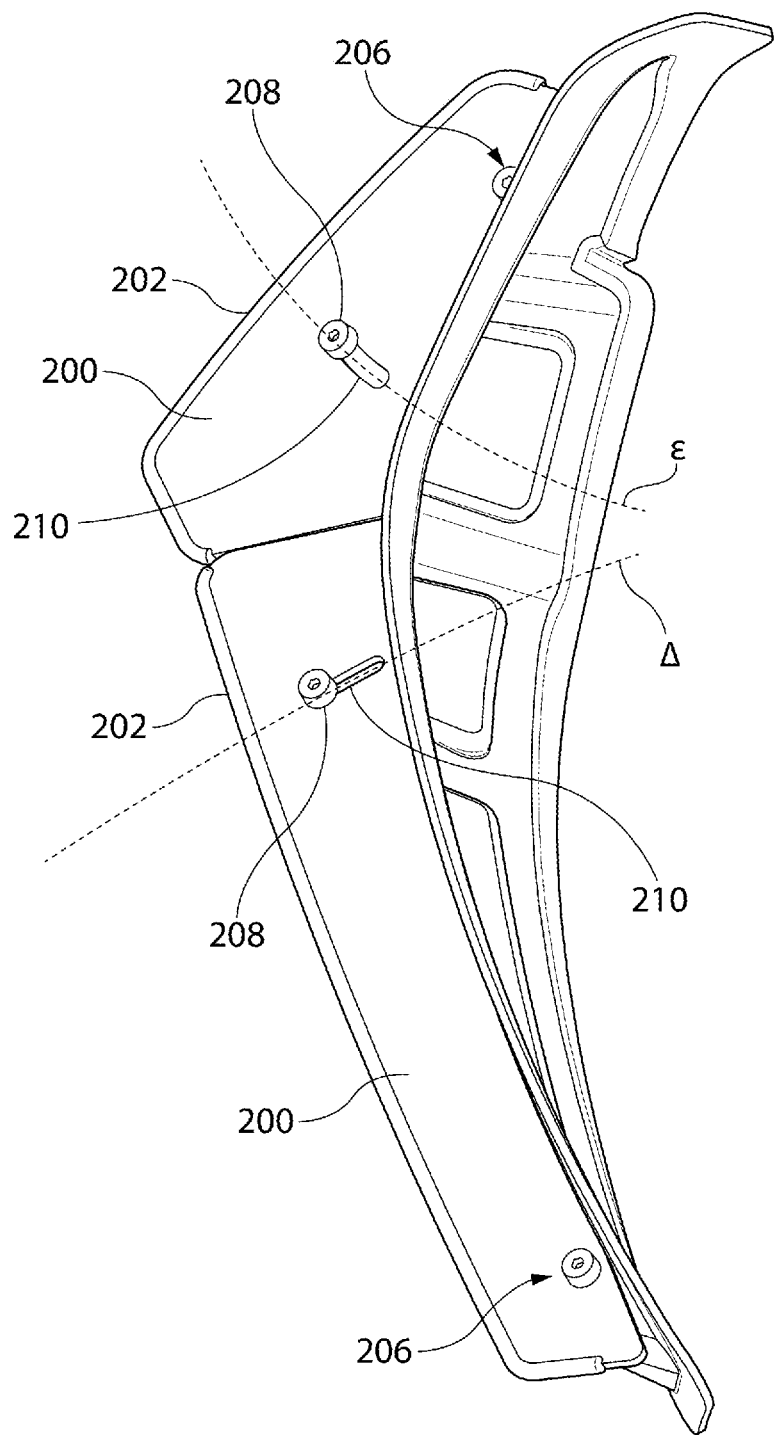
FIG. 14 is a rear view of an adjustable wind deflector according to an embodiment of the present disclosure.
Figure 15:
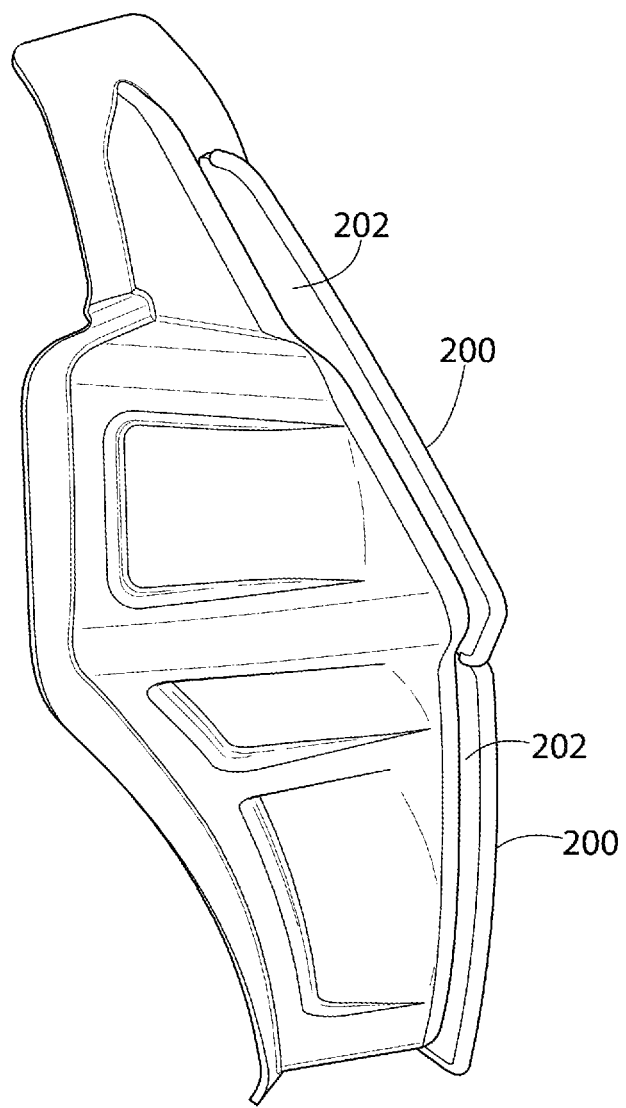
FIG. 15 is a front upper perspective view of an adjustable wind deflector according to an embodiment of the present disclosure.
Figure 16:
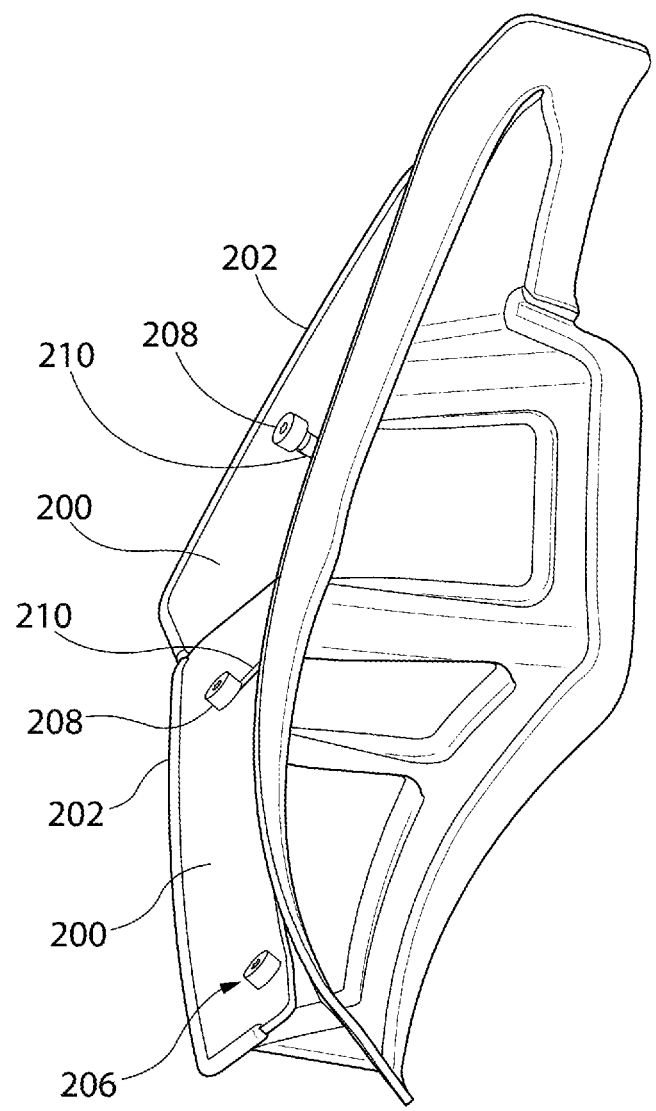
FIG. 16 is a rear perspective view of an adjustable wind deflector according to an embodiment of the present disclosure.

FIGS. 9-16 illustrate a fairing extension 100 with a first extendible planar surface 200 according to an embodiment of the present disclosure. According to such an embodiment, the fairing extension 100 includes one extendible planar surface 200. According to another embodiment, the fairing extension 100 includes a first extendible planar surface 200 and a second extendible planar surface 201. According to another embodiment the fairing extension 100 includes more than two extendible planar surfaces. According to an embodiment, the first extendible planar surface 200 includes a first edge 202 and a second edge 204. According to an embodiment, the second extendible planar surface 201 includes a second extendible planar surface first edge 208 and a second extendible planar surface second edge 210. According to an embodiment, the first extendible planar surface 200 includes a first hinge 206. In such an embodiment, the first hinge 206 attaches the first extendible planar surface 200 to the fairing extension 100. According to an embodiment, the second extendible planar surface 201 includes at least one second hinge 207. In such an embodiment, the second hinge 207 attaches the second extendible planar surface 201 to the fairing extension 100. According to an embodiment, the first extendible planar surface 200 is adjustable relative to the fairing extension 100 about the first hinge 206 along an adjustment plane Δ. According to an embodiment, the adjustment plane Δ is perpendicular to the third and fourth external planar surfaces 116 and/or 118. According to an embodiment, the adjustment plane Δ is parallel to the first and second external planar surfaces 112 and 114. According to an embodiment, the first extendible planar surface 200 includes a first adjustment pin 212 extending from the surface of the fairing extension 100 through a first aperture 214 in the first extendible planar surface 200. The first aperture 214 limits the rotation of the first extendible planar surface 200 about the fairing extension 100 along the adjustment plane Δ. Limitation of the rotation of the first extendible planar surface 200 is caused by the contact of the first adjustment pin 212 with the walls of the first aperture 214. According to an embodiment, the first adjustment pin 212 allows for extension of the extendible planar surface up to a maximum extension. According to an embodiment, the first extendible planar surface 200 extends more than two inches beyond the leading edge 130. According to an embodiment, the first extendible planar surface 200 extends between one and two inches beyond the leading edge 130. According to an embodiment, the first extendible planar surface 200 extends one inch beyond the leading edge 130. According to an embodiment, the first extendible planar surface 200 extends less than one inch beyond the leading edge 130.

According to an embodiment, the second extendible planar surface 201 includes a second hinge 207. In such an embodiment, the second hinge 207 attaches the second extendible planar surface 201 to the fairing extension 100. According to an embodiment, the second extendible planar surface 201 is adjustable relative to the fairing extension 100 about the second hinge 207 along a second adjustment plane Σ. According to an embodiment, the second adjustment plane Σ is parallel to the third and/or fourth external planar surfaces 116 and 118. According to an embodiment, the second extendible planar surface 201 includes a second adjustment pin 218 extending from the surface of the fairing extension 100 through a second aperture 216 in the second extendible planar surface 201. The second aperture 216 limits the rotation of the second extendible planar surface 201 about the fairing extension 100 along the adjustment plane Δ. Limitation of the rotation of the second extendible planar surface 201 is caused by the contact of the second adjustment pin 218 with the walls of the second aperture 216. According to an embodiment, the second adjustment pin 218 allows for extension of the second extendible planar surface 201 up to a maximum extension. According to an embodiment, the second extendible planar surface 201 extends more than two inches beyond the leading edge 130. According to an embodiment, the second extendible planar surface 201 extends between one and two inches beyond the leading edge 130. According to an embodiment, the second extendible planar surface 201 extends one inch beyond the leading edge 130. According to an embodiment, the second extendible planar surface 201 extends less than one inch beyond the leading edge 130.

According to an embodiment of the present disclosure, rotation of the first extendible planar surface 200 and the second extendible planar surface 201 adjusts the deflection angles α and β, such that increased extension of the first extendible planar surface 200 and the second extendible planar surface 201 increases the deflection angles α and β.

Figure 17:
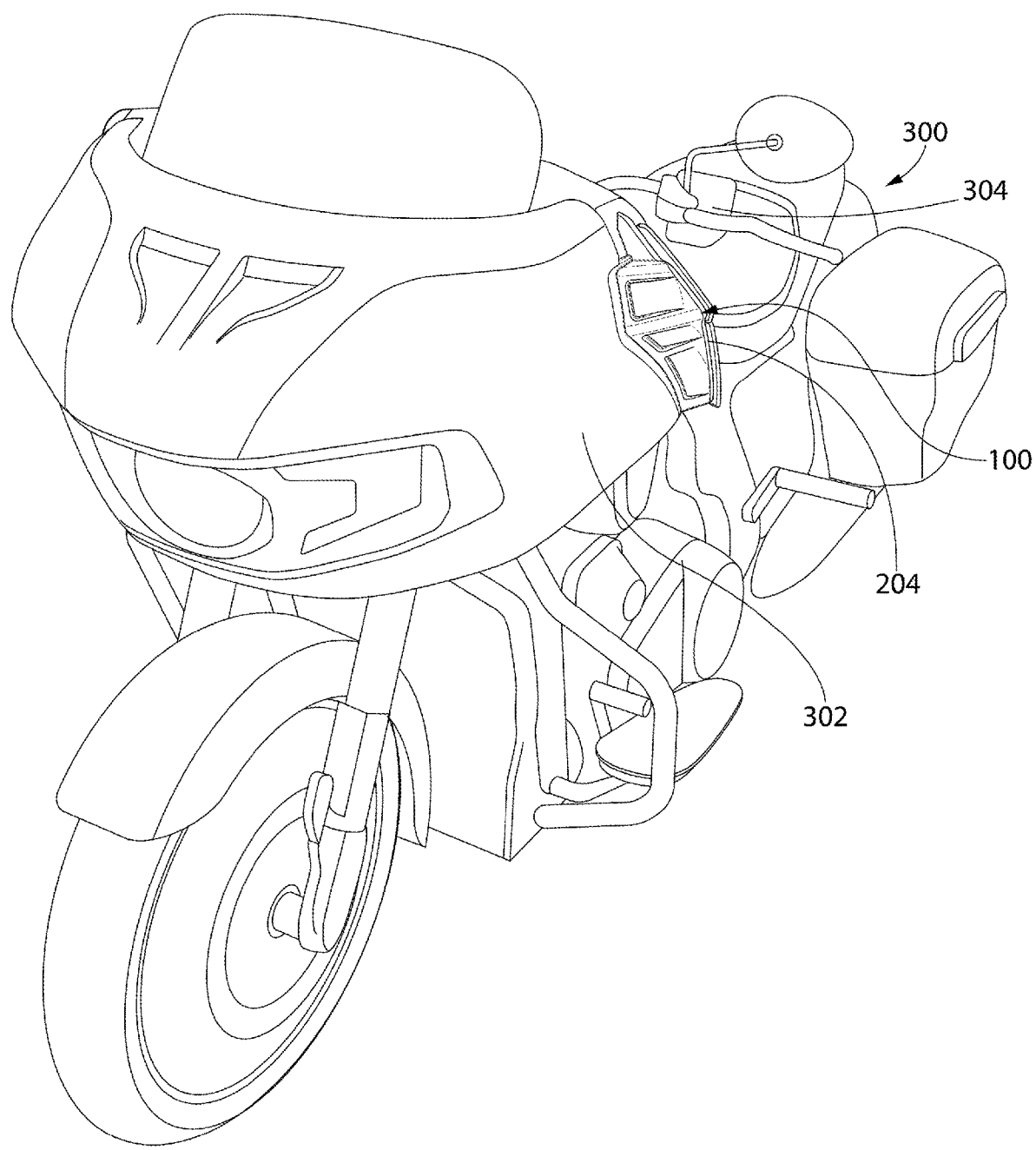
FIG. 17 illustrates a vehicle coupled with an adjustable wind deflector according to an embodiment of the present disclosure.
Figure 18:
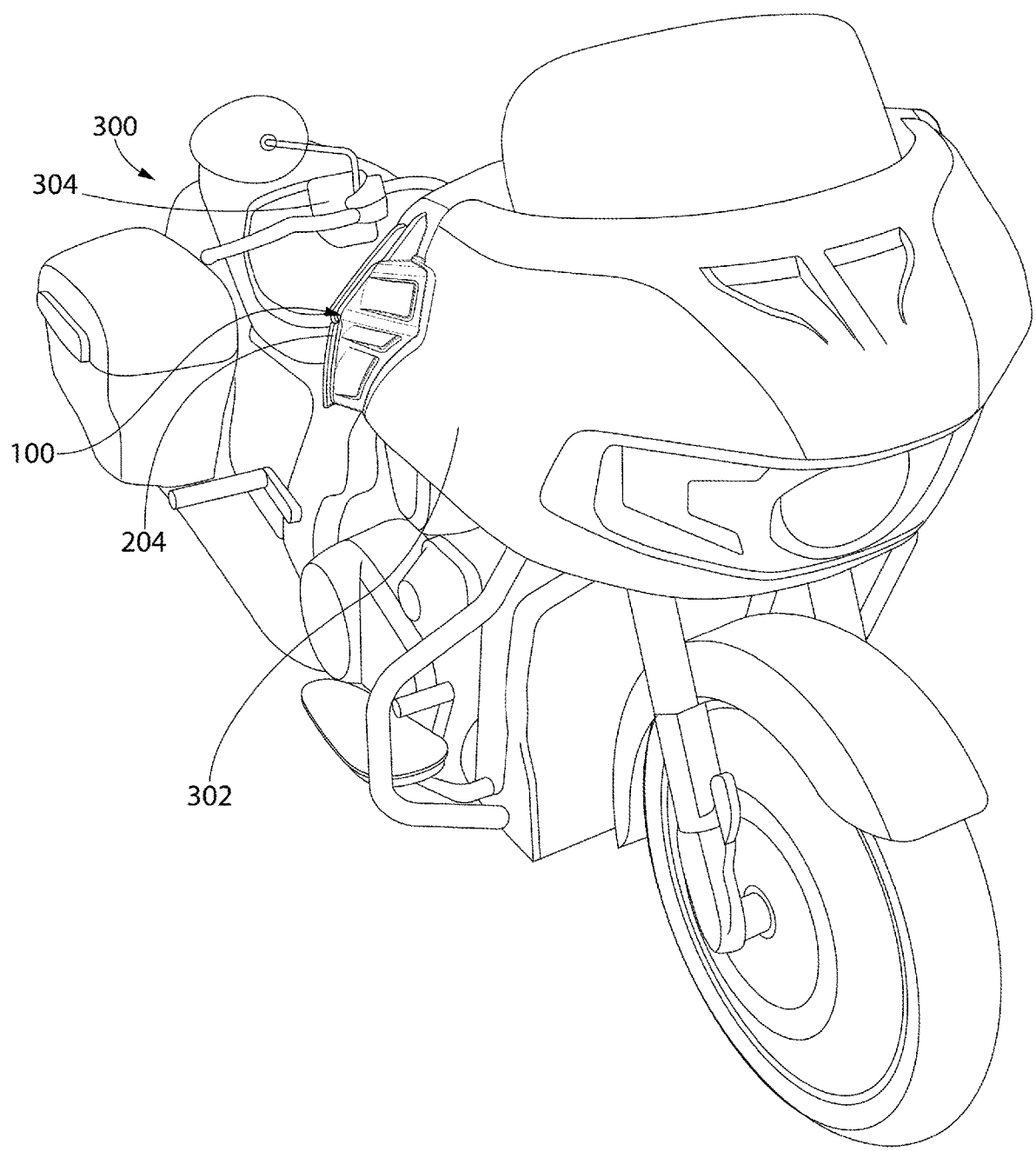
FIG. 18 illustrates a vehicle coupled with an adjustable wind deflector according to an embodiment of the present disclosure.
Figure 19:
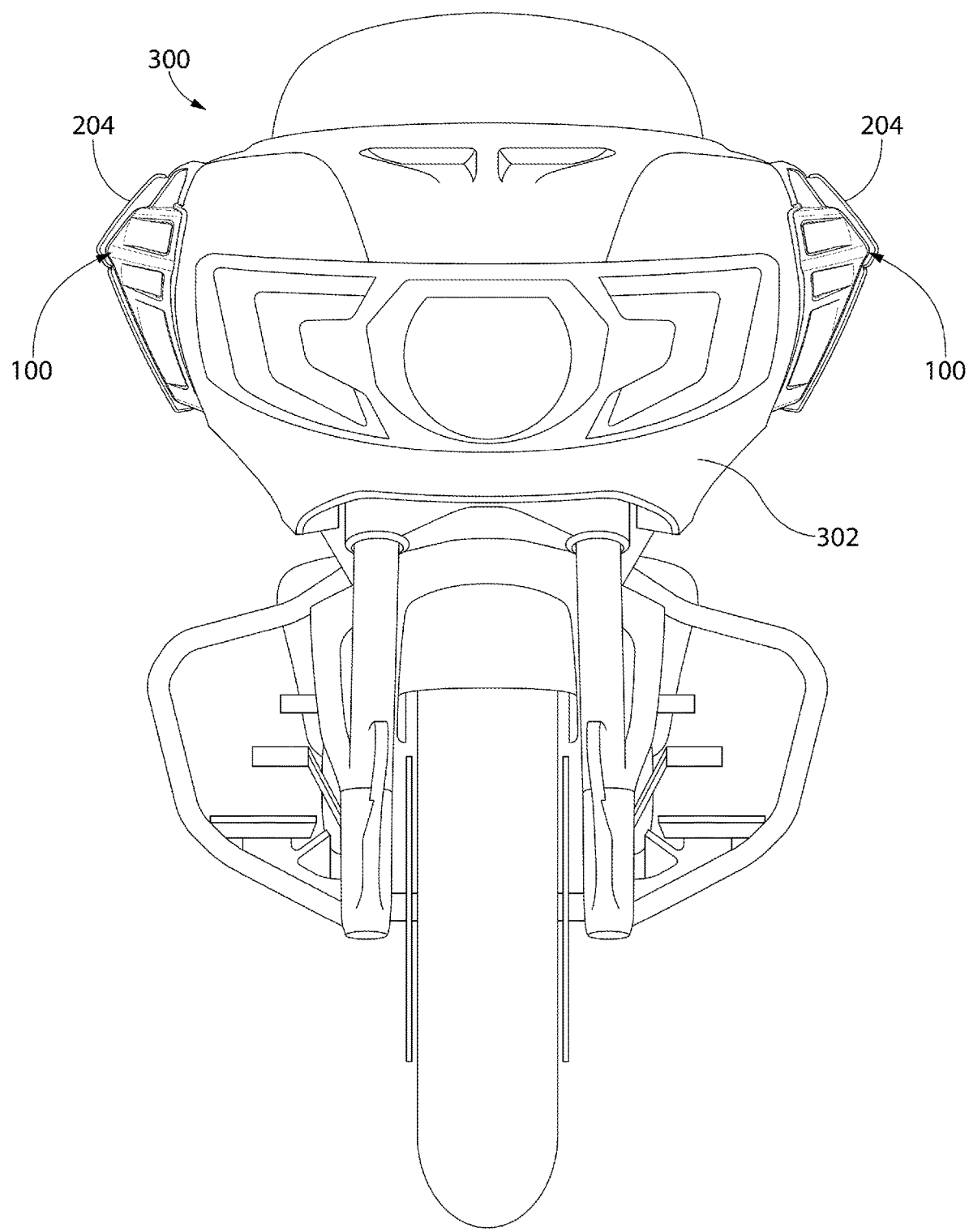
FIG. 19 illustrates a vehicle coupled with two adjustable wind deflectors according to an embodiment of the present disclosure.
Figure 20:
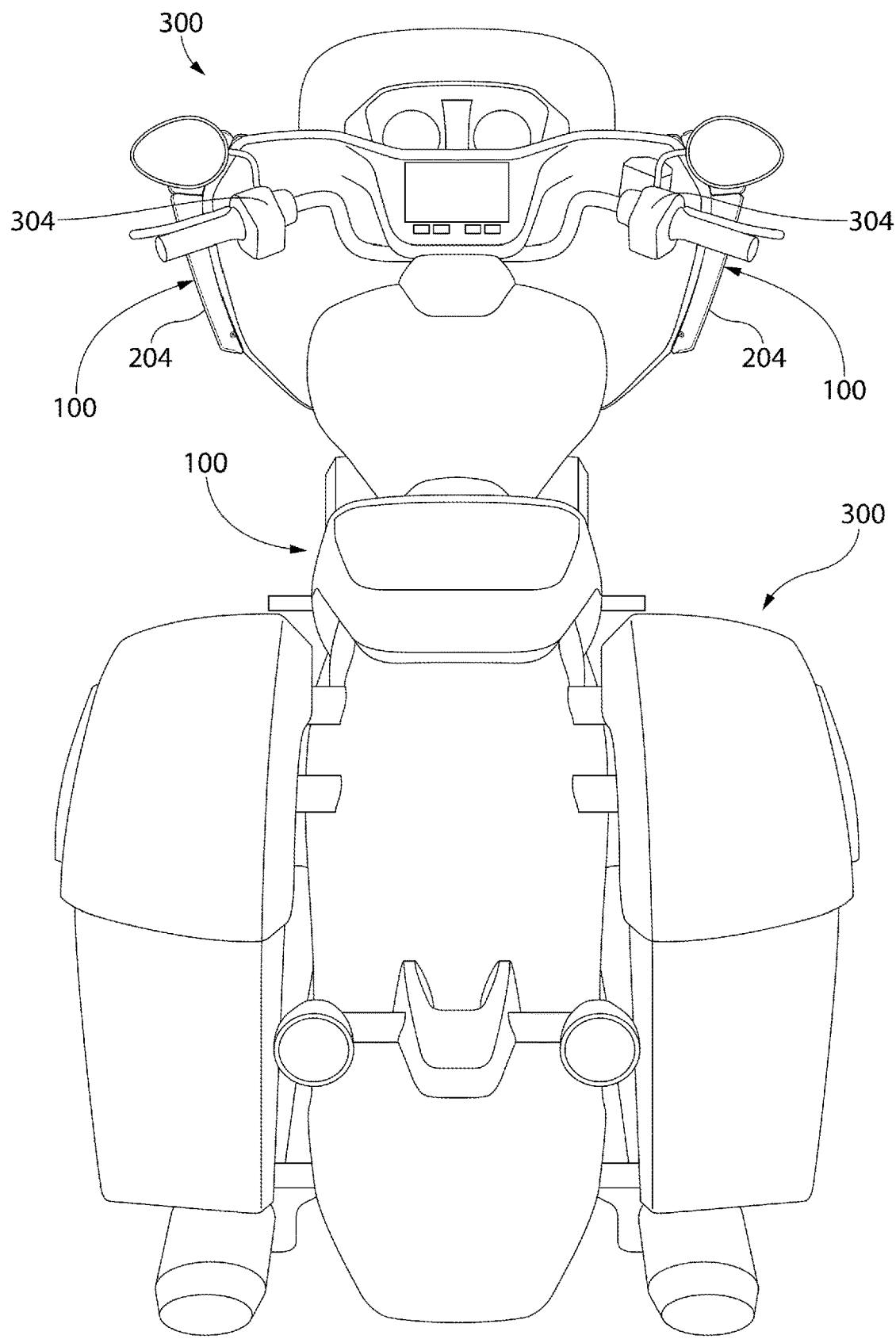
FIG. 20 illustrates a vehicle coupled with two adjustable wind deflectors according to an embodiment of the present disclosure

FIGS. 17-20 illustrate the fairing extension 100 engaged with a vehicle 300. The vehicle 300 of the illustrated embodiment is a motorcycle. In one or more embodiments not illustrated, the vehicle 300 is a utility task vehicle, all-terrain vehicle, car, truck, tractor, golf cart, or any other vehicle. According to an embodiment of the present disclosure, the fairing extension 100 is removably attached to the fairing 302 of the vehicle 300. According to an embodiment of the present disclosure, the fairing 302 attaches directly to the frame of the vehicle 300. According to another embodiment the fairing 302 attaches to the front forks of the vehicle 300. The engagement of the fairing extension 100 to the fairing 302 deflects air, precipitation, debris, sand, mud, insects, etc. away from the leading edge 130 at deflection angle α and deflection angle β. Further the first extendible planar surface 200 and the second extendible planar surface 201 allow the operator to adjust the deflection angle α by rotating the first extendible planar surface 200 about the first hinge 206 and/or to adjust the deflection angle β by rotating the second extendible planar surface 201 about the second hinge 20718. According to an embodiment, the vehicle 300 includes handlebars 304.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

I claim:

1. A motor vehicle comprising:
   a frame,
   a fairing,
   handlebars, and
   at least one adjustable fairing extension;
   wherein said fairing and said handlebars are connected to said frame such that the handlebars are positioned rearward of the fairing when viewed from an operator's position, such that the fairing deflects air about the handlebars at a first deflection angle;
   wherein the fairing is removably attached to the at least one adjustable fairing extension, said adjustable fairing extension comprising:
   at least one planar surface,
   at least one extendible planar surface,
   a hinge,
   an aperture, and
   at least one adjustment pin;
   wherein the at least one extendible planar surface attaches to the at least one planar surface via the hinge and the at least one adjustment pin is disposed through the aperture on the extendible planar surface, such that the extendible planar surface is adjustable about said hinge along an adjustment plane up to the maximum extension allowed by the at least one adjustment pin; and
   wherein the extension of the at least one extendible planar surface deflects air about the handlebars at a second deflection angle.

2. The motor vehicle of claim 1, wherein the at least one planar surface of the fairing extension comprises at least one deflection channel.

3. The motor vehicle of claim 1, wherein the maximum extension of the extendible planar surfaces is more than two inches.

4. The motor vehicle of claim 1, wherein the maximum extension of the extendible planar surface is between one and two inches.

5. The motor vehicle of claim 1, wherein the maximum extension of the extendible planar surfaces is less than one inch.

6. The motor vehicle of claim 1, wherein the at least one fairing extension comprises four planar surfaces.

7. The motor vehicle of claim 6, wherein the at least one fairing extension comprises two extendible planar surfaces.

8. An adjustable fairing extension comprising
at least one planar surface,
at least one extendible planar surface,
a hinge,
an aperture, and
at least one adjustment pin;
wherein the at least one extendible planar surface attaches to the at least one planar surface via the hinge and the at least one adjustment pin is disposed through the aperture of said at least one extendable planar surface, such that the at least one extendible planar surface is adjustable about said hinge along an adjustment plane up to the maximum extension allowed by the at least one adjustment pin; and
wherein the extension of the at least one extendible planar surface deflects air about handlebars at a second deflection angle.

9. The adjustable fairing extension of claim 8, wherein the at least one planar surface comprises at least one deflection channel.

10. The adjustable fairing extension of claim 8, wherein the maximum extension of the at least one extendible planar surface is more than two inches.

11. The adjustable fairing extension of claim 8, wherein the maximum extension of the extendible planar surface is between one and two inches.

12. The adjustable fairing extension of claim 8, wherein the maximum extension of the extendible planar surface is less than one inch.

13. The adjustable fairing extension of claim 8, wherein the fairing extension comprises four planar surfaces.

14. The adjustable fairing extension of claim 8, wherein the fairing extension comprises two at least one extendible planar surfaces.

* * * * *